Figure 1:
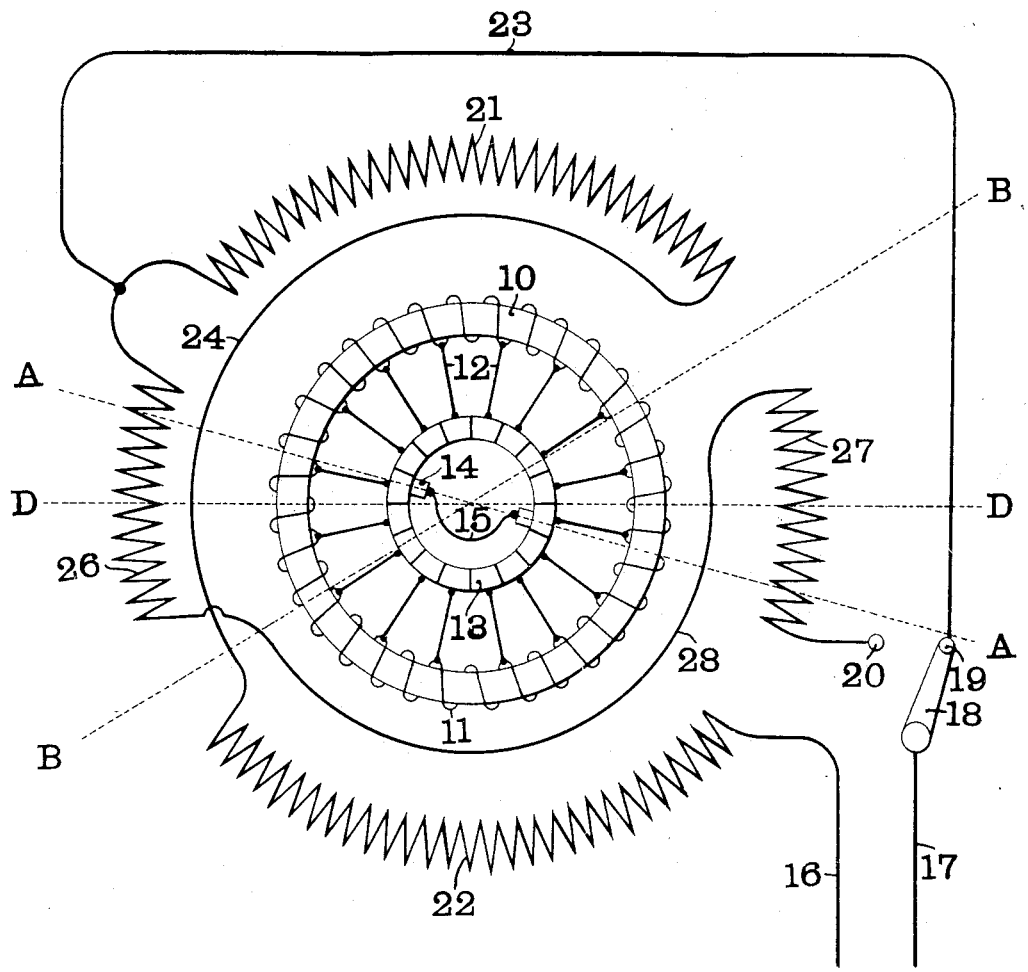

No. 792,466. PATENTED JUNE 13, 1905.
L. SCHÜLER.
ALTERNATING CURRENT MOTOR.
APPLICATION FILED JUNE 17, 1904.

2 SHEETS—SHEET 1.

WITNESSES:
Fred Henke
W. A. Alexander

INVENTOR
Leo Schüler.
BY
Fowler & Bryson
ATTORNEYS

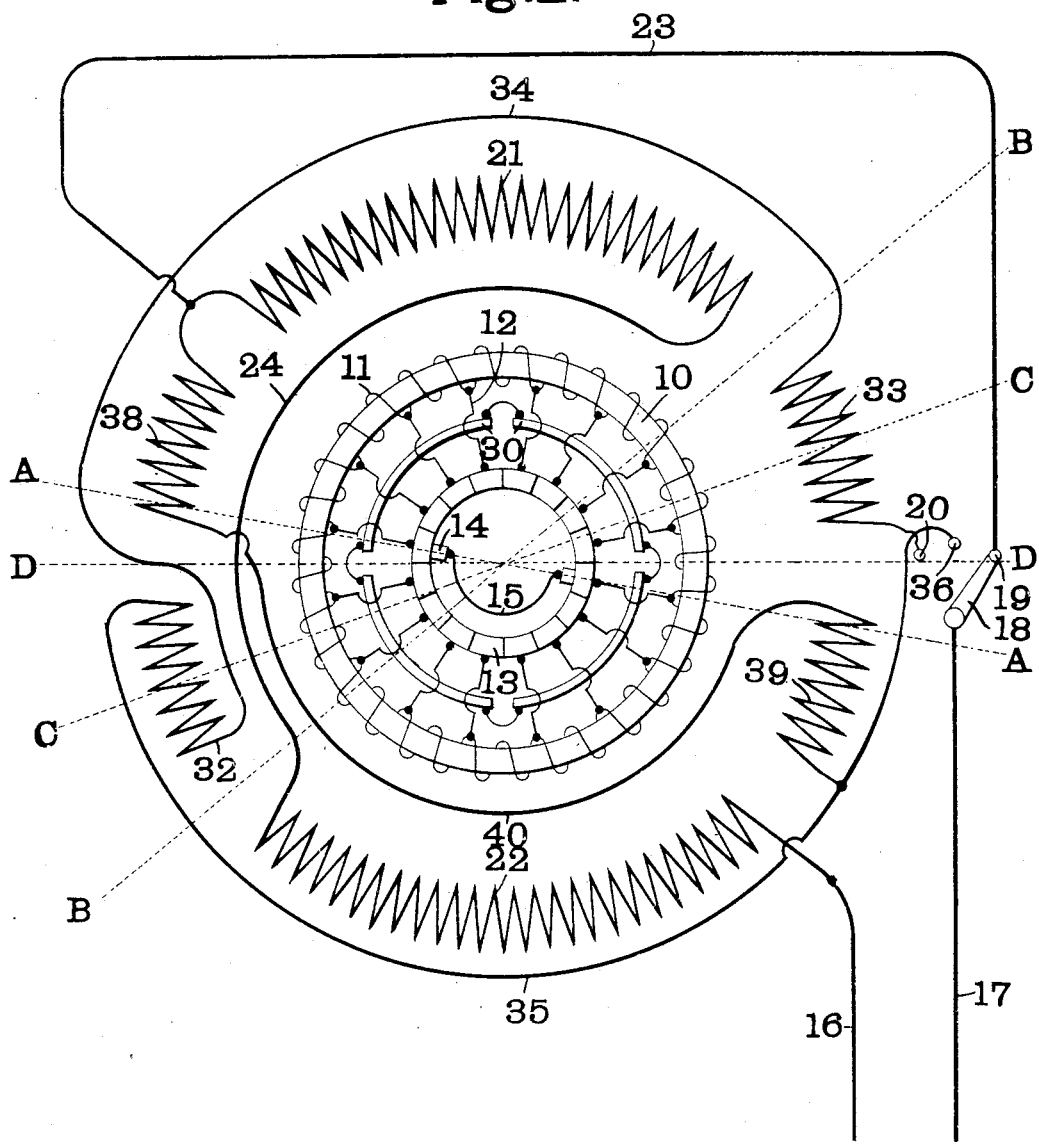

No. 792,466.

Patented June 13, 1905.

UNITED STATES PATENT OFFICE.

LEO SCHÜLER, OF ST. LOUIS, MISSOURI.

ALTERNATING-CURRENT MOTOR.

SPECIFICATION forming part of Letters Patent No. 792,466, dated June 13, 1905.

Application filed June 17, 1904. Serial No. 212,959.

*To all whom it may concern:*

Be it known that I, LEO SCHÜLER, a subject of the Emperor of Germany, residing at the city of St. Louis, in the State of Missouri, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to starting alternating-current motors, and more particularly single-phase alternating-current motors in which one of the members, preferably the rotor, is provided with a circuit suitably connected to a commutator or other similar means for determining the position of the poles of such member.

The object of my invention is to so shift the poles of one of the members of the motor with respect to the other and during the operation of starting and running up to normal speed that the motor will start and attain such speed under the most favorable conditions for producing the proper torque and with a minimum consumption of current. To this end I provide the motor with a subdivided field-winding, the organization or electrical connections of which may be modified to suitably vary the angular displacement of the poles of the field with relation to those of the armature.

In starting motors of the general type above referred to I have found that an angular displacement of substantially fifteen electrical degrees between the poles of the field and those of the armature is most advantageous for producing the static torque desirable for bringing the rotor to a certain speed—say substantially one thousand revolutions per minute—and that after such speed has been attained the rotor is best brought up to normal running speed by reducing such angular displacement to substantially five degrees, though of course these proportions and values may be varied without departing from my invention.

In the accompanying drawings, which show slightly-differing forms of motor embodying my invention, and in which like characters of reference refer to similar parts in the different views, Figure 1 is a diagrammatic representation of the field and armature windings of such a motor; and Fig. 2 is a diagram of a motor embodying my invention, but differing slightly from the form shown in Fig. 1.

Referring first to Fig. 1, 10 indicates the core of the induced or rotary member or armature of the motor; 11, the armature-winding, here shown as of the continuous type; 12, leads from said winding connecting the same with the segments of a commutator 13; 14, brushes resting on said commutator, and 15 a conductor connecting said brushes together in locally-closed circuit. These parts are of usual and well-known construction and operation and are therefore not more particularly described herein. They may be varied widely from the form here shown without departing from my invention. 16 and 17 indicate the main conductors supplying current to the field of the motor. 18 is a switch adapted to connect the conductor 17 to either of the contacts 19 and 20. The main field-winding or circuit of the motor is divided into two diametrically opposite sections 21 and 22. One end of the section 21 is connected, by means of the wire 23, with the contact 19. Its opposite end is connected, by means of the wire 24, with one end of the section 22, the opposite end of which last-mentioned section is connected to the main conductor 16.

The field of my motor is provided with an auxiliary winding divided into two sections 26 and 27. The section 26 has one of its ends connected to the wire 23, and its opposite end is connected, by means of the wire 28, with one end of the section 27, the opposite end of which is connected with the contact 20.

Referring now to Fig. 2, it will be seen that the armature there shown differs from the armature shown in Fig. 1 only in that the armature at Fig. 2 is provided with a short-circuiting ring 30, which is adapted to be clamped upon the segments of the commutator 13 in any suitable manner after the motor has attained normal running speed. This device is already well known in the art, and its construction and operation need not be further described herein.

The field of the motor shown in Fig. 2 differs from that of Fig. 1, however, in that it is provided with two auxiliary field-windings. The sections 21 and 22 are connected in series by means of the wires 23 and 24 between the contact 19 and the main line 16, as described in connection with Fig. 1. 32 and 33 are the sections of an auxiliary winding. One end of the section 33 is connected to the contact 20, and its other end is connected, by means of a wire 34, with one end of the section 32, the other end of which is connected, by means of a conductor 35, with a third contact 36 within reach of the switch-arm 18 and situated between the contacts 19 and 20. A second auxiliary winding is composed of the sections 38 and 39. One end of the section 38 is connected to the conductor 23, and its opposite end, by means of the conductor 40, is connected to one end of the section 39, the other end of which is connected to the conductor 35.

In the operation of my device, and referring first to Fig. 1, it is evident that when the brushes are in the position there shown the field generated by the currents induced in the armature of the motor will have the axis of its poles substantially coincident with the dotted line A A. When the motor is started from rest under load, the switch-arm 18 is placed upon the contact 20. It is evident that under such circumstances the current from the main line will pass in series through the sections 21 and 22 of the main winding and 26 and 27 of the auxiliary winding. This generates a magnetic field, the poles of which are substantially coincident with the dotted line B B, thus bringing about an angular displacement of substantially fifteen electrical degrees between the poles generated by the field-winding and the poles generated by the induced currents in the armature. This displacement I find very advantageous, as above explained, for producing a static torque most favorable for starting the motor and for bringing it to a certain speed—for instance, about one thousand revolutions per minute. When this speed has been attained, the switch 18 is thrown to the contact 19, and the auxiliary sections 26 and 27 are cut out of circuit, leaving in active operation only the sections 21 and 22 of the main winding. This gives rise to a shifting of the poles of the field of the motor until their axial line coincides substantially with the dotted line D D, and such poles are angularly displaced substantially five electrical degrees from the armature-poles. This displacement produces torque in the direction in which the motor has started to rotate and places the motor in favorable condition for running up from the one thousand revolutions per minute already attained to a normal running speed of, say, fifteen hundred (1500) revolutions per minute.

Referring now to the operation of the device shown in Fig. 2, it is thought that the same will be readily evident from the description already given. When the motor starts from rest with the switch 18 on the contact 20, the main winding and both of the auxiliary windings 32 33 and 38 39 are connected in series in the circuit and are in active operation, thus generating a magnetic field the axis of whose poles is indicated by the dotted line B B, which line is displaced substantially fifteen (15) electrical degrees from the axial line A A of the armature-poles. After the motor has obtained the desired speed under these conditions the switch 18 is shifted to the contact 36. This excludes the auxiliary winding 32 33 from circuit and shifts the axial line of the poles of the field to substantially the position of the line C C, intermediate the lines B B and A A, and substantially ten (10) electrical degrees displaced from the axial line A A of the armature-poles. When the speed of the motor has been suitably increased under these conditions, the switch 18 is shifted to the position shown in Fig. 2— that is, to contact 19. This excludes the remaining auxiliary winding 38 39 from the circuit, leaving only the main winding in active operation. A field is thus generated which has the axial line of its poles substantially coincident with the dotted line D D, intermediate the axial line A A of the armature-poles and the former positions B B and C C of the field-poles and displaced angularly substantially five (5) electrical degrees from the axial line A A of the armature-poles. In this condition the motor is allowed to run up to normal speed. When such speed has been obtained, the short-circuiting device 30 is moved by any suitable means into contact with the segments of the commutator 13, thus short-circuiting said commutator, after which the motor will run in the ordinary way as an induction-motor.

Having fully described my invention, what I claim as new, and desire to secure by Letters Patent of the United States, is—

1. In an electric motor, a member provided with a circuit producing definite magnetic poles therein, a second member, a conductor on said second member forming poles for producing torque in a given direction, and means for controlling the magnetizing effect of a portion of said conductor to shift the poles of said second member to a position producing torque in the same direction.

2. In an electric motor, a member provided with a circuit producing definite poles therein, a second member, a conductor on said second member forming poles for producing torque in a given direction, and means for excluding a portion of said conductor from effective operation to shift the poles of said second member to a position producing torque in the same direction.

3. In an electric motor, a member provided with a circuit producing definite poles therein, a second member, a conductor on said second member for producing magnetic poles therein, a second conductor on said second member for producing magnetic poles therein causing torque in a given direction, said second conductor being in series with said first-named conductor, and means for excluding said second conductor from effective operation to shift the poles of said second member to a position producing torque in the same direction.

4. In an electric motor, a member provided with a circuit producing definite poles therein, a second member provided with a conductor for producing magnetic poles therein, a second conductor on said second member for producing jointly with said first-named conductor poles causing torque in a given direction, and means for excluding said second conductor from effective operation to shift the poles of said second member to a position producing torque in the same direction.

5. In an electric motor, a member provided with a circuit producing definite poles therein, a second member, a conductor on said second member forming poles for producing torque in a given direction, means for controlling the magnetic effect of a portion of said second conductor to shift the poles of said second member to a position producing torque in the same direction, and means for short-circuiting said second member.

In testimony whereof I have hereunto set my hand and affixed my seal in the presence of the two subscribing witnesses.

LEO SCHÜLER. [L. S.]

Witnesses:
 FRED HENKE,
 D. C. BETJEMAN.